United States Patent
Naga et al.

(10) Patent No.: US 9,548,962 B2
(45) Date of Patent: Jan. 17, 2017

(54) APPARATUS AND METHOD FOR PROVIDING A FLUID SECURITY LAYER

(75) Inventors: Krishna P. Puttaswamy Naga, Metuchen, NJ (US); Fang Hao, Morganville, NJ (US); Antony Martin, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/469,176

(22) Filed: May 11, 2012

(65) Prior Publication Data

US 2013/0305311 A1    Nov. 14, 2013

(51) Int. Cl.
*H04L 29/06* (2006.01)

(52) U.S. Cl.
CPC ........... *H04L 63/0263* (2013.01); *H04L 63/20* (2013.01)

(58) Field of Classification Search
CPC .............................. H04L 63/0263; H04L 63/20
USPC ............. 718/1; 709/202–204, 213, 223–226; 726/1–3, 11, 12, 24; 370/235
See application file for complete search history.

(56) References Cited

U.S. PATENT DOCUMENTS

| 2005/0022022 A1* | 1/2005 | Mendonca et al. ............ 713/201 |
| 2006/0013136 A1* | 1/2006 | Goldschmidt et al. ........ 370/235 |
| 2006/0136437 A1* | 6/2006 | Yamasaki ...................... 707/100 |
| 2008/0163207 A1* | 7/2008 | Reumann et al. ................. 718/1 |
| 2009/0249438 A1* | 10/2009 | Litvin et al. ....................... 726/1 |
| 2010/0011432 A1* | 1/2010 | Edery et al. ..................... 726/11 |
| 2010/0169507 A1* | 7/2010 | Sahita et al. ................... 709/250 |
| 2010/0319004 A1* | 12/2010 | Hudson et al. ................. 719/313 |
| 2011/0072487 A1* | 3/2011 | Hadar et al. ....................... 726/1 |
| 2011/0302647 A1* | 12/2011 | Bhattacharya et al. ......... 726/11 |
| 2012/0011077 A1* | 1/2012 | Bhagat .......................... 705/317 |
| 2012/0110186 A1* | 5/2012 | Kapur et al. ................... 709/226 |

(Continued)

FOREIGN PATENT DOCUMENTS

| JP | 2002-261829 | 9/2002 |
| JP | 2008-526144 | 7/2008 |

(Continued)

OTHER PUBLICATIONS

Jun. 17, 2013 The International Search Report and the Written Opinion of the International Searching Authority, or the Declaration, in PCT/US2013/034270, Alcatel-Lucent USA Inc., Applicant, 10 pages.

*Primary Examiner* — Izunna Okeke
*Assistant Examiner* — Hee Song
(74) *Attorney, Agent, or Firm* — Tong, Rea, Bentley & Kim, LLC

(57) ABSTRACT

A security management capability enables migration of individual security rules between storage/application locations. The migration of a security rule may include selection of a location at which the security rule is to be applied and migration of the security rule to the selected location at which the security rule is to be applied. The selection of the location at which the security rule is to be applied may be performed based on security rule policies and/or security rule location selection information. The security rule is migrated from a current location (e.g., a location at which the security rule is currently applied, a management system, or the like) to the selected location at which the security rule is to be applied. In this manner, a fluid security layer may be provided. The fluid security layer may be optimized for one or more of security level, performance, cost, or the like.

20 Claims, 3 Drawing Sheets

(56) References Cited

U.S. PATENT DOCUMENTS

| | | | |
|---|---|---|---|
| 2012/0159572 A1* | 6/2012 | Patel et al. | 726/3 |
| 2012/0185913 A1* | 7/2012 | Martinez et al. | 726/1 |
| 2012/0216241 A1* | 8/2012 | Alon et al. | 726/1 |
| 2012/0304244 A1* | 11/2012 | Xie et al. | 726/1 |
| 2013/0007840 A1* | 1/2013 | Sabin et al. | 726/3 |
| 2013/0111032 A1* | 5/2013 | Alapati et al. | 709/226 |
| 2013/0152076 A1* | 6/2013 | Patel | 718/1 |
| 2013/0291052 A1* | 10/2013 | Hadar et al. | 726/1 |

FOREIGN PATENT DOCUMENTS

| | | | |
|---|---|---|---|
| JP | 2009116852 A | 5/2009 | |
| JP | 2011108014 A | 6/2011 | |

\* cited by examiner

APPARATUS AND METHOD FOR PROVIDING A FLUID SECURITY LAYER

TECHNICAL FIELD

The invention relates generally to communications and, more specifically but not exclusively, to providing security for communications.

BACKGROUND

Cloud-based data centers are rapidly becoming the choice of enterprises and individual users to host their data While cloud-based data centers have been re-engineered in recent years to address the growing volume of data being hosted within cloud-based data centers (e.g., to provide multi-path capabilities, higher bandwidth, higher scalability, and other features enabling support for increasing numbers of hosts), many security services providing security for cloud-based data centers are lagging in terms of technological innovation.

SUMMARY

Various deficiencies in the prior art are addressed by embodiments for security management.

In one embodiment, an apparatus includes a processor and a memory communicatively connected to the processor, where the processor is configured to select a location at which a security rule is to be applied based on a policy associated with the security rule and initiate migration of the security rule to the selected location at which the security rule is to be applied.

In one embodiment, a computer-readable storage medium stores instructions which, when executed by a computer, cause the computer to perform a method including selecting a location at which a security rule is to be applied based on a policy associated with the security rule and initiating migration of the security rule to the selected location at which the security rule is to be applied.

In one embodiment, a method includes selecting a location at which a security rule is to be applied based on a policy associated with the security rule and initiating migration of the security rule to the selected location at which the security rule is to be applied.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
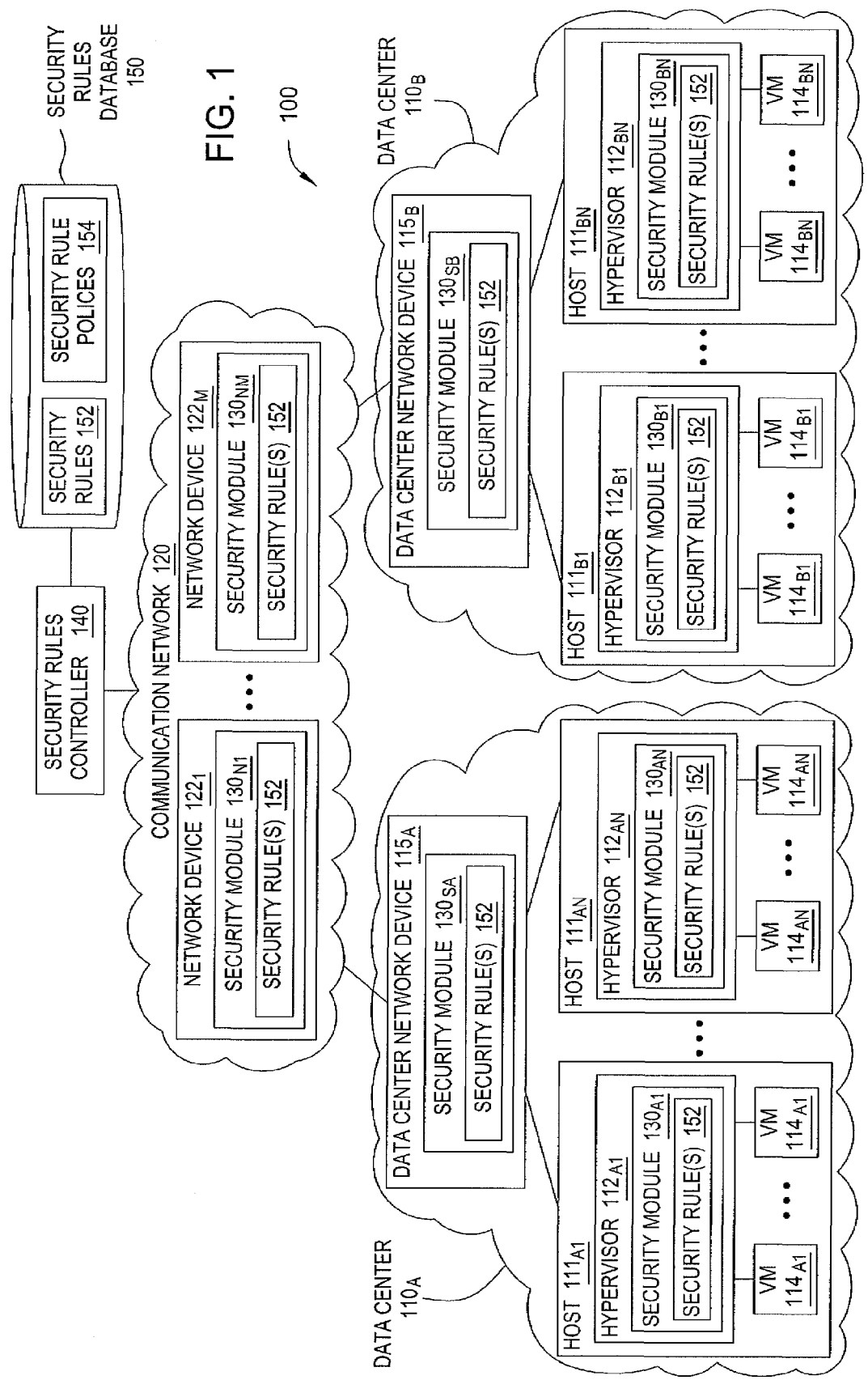
FIG. 1 depicts a high-level block diagram of an exemplary cloud system configured to support security management.

In general, a security management capability is depicted and described herein, although various other capabilities also may be presented herein.

In at least some embodiments, the security management capability enables migration of individual security rules and/or groups of security rules between storage/application locations at which security rules are to be stored/applied. The storage/application locations may be located within data centers (which may be referred to as data center locations), within communication networks between data centers (which may be referred to herein as network locations, or the like, as well as various combinations thereof. The storage/application locations may be referred to more generally herein as locations.

In at least some embodiments, the migration of a security rule may include selection of a location at which the security rule is to be applied and migration of the security rule to the selected location at which the security rule is to be applied. The selection of the location at which the security rule is to be applied may be performed based on a security rule policy and/or security rule location selection information. The security rule is migrated from a current location (e.g., a location at which the security rule is currently applied, a management system, or the like) to the selected location at which the security rule is to be applied. In this manner, a fluid security layer may be provided. The fluid security layer may be optimized for one or more of security level, performance, cost, or the like, as well as various combinations thereof.

In at least some embodiments, the security management capability is configured to enable migration of security rules based on security rule policies and/or various types of security rule location selection information, thereby providing significant flexibility in terms of placing specific security rules at specific (and, in at least some cases, ideal) locations based on various considerations (e.g., customer requirements, data center status, or the like).

In at least some embodiments, the security management capability is configured to enable security deployment for cloud-related communications in a manner that enables users of the cloud to realize the benefits of various enhancements in data center networks (e.g., using multi-path capabilities, providing higher bandwidth, providing higher scalability, or the like) without degrading the security properties of the data center networks. In at least some embodiments, the security management capability obviates the need to manage security modules (e.g., firewalls or the like) in the granularity of virtual machines via movement of virtual machines (e.g., where each virtual machine is hosting or otherwise responsible for checking a set of customer rules (often all of the rules of the associated customer) and/or requiring all customer traffic to traverse the virtual machine(s) hosting and enforcing all of the customer rules).

In at least some embodiments, the security management capability leads to improvements for applications and services hosted in data centers (e.g., improved performance, such as in terms of obtained bandwidth and response latency), as well as improvements in the overall efficiency of the data centers (e.g., by adapting to the load and optimizing the location of various security checks).

It will be appreciated that, although primarily depicted and described within the context of managing security rules applied to communications of cloud data centers, various functions of the security management capability may be adapted for use in managing security rules which may be applied to various other types of communications (e.g., communications other than those associated with cloud data centers).

FIG. 1 depicts a high-level block diagram of an exemplary cloud system configured to support security management.

The cloud system 100 includes a first data center $110_A$ and a second data center $110_B$ (collectively, data centers 110), a communication network 120, a plurality of security modules 130 distributed across various elements of cloud system 100, a security rules controller 140, and a security rules database 150 including security rules 152 and security rule policies 154.

The first data center $110_A$ includes a plurality of hosts $111_{A1}$-$111_{AN}$ (collectively, hosts $111_A$). The hosts $111_{A1}$-$111_{AN}$ include respective hypervisors $112_{A1}$-$112_{AN}$ (collectively, hypervisors $112_A$). The hosts $111_{A1}$-$111_{AN}$ also include respective pluralities of virtual machines $114_{A1}$-$114_{AN}$ (collectively, pluralities of virtual machines $114_A$). The first data center $110_A$ also includes a data center network device $115_A$ communicatively connected to each of the hosts 111.

The second data center $110_E$ includes a plurality of hosts $111_{B1}$-$111_{BN}$ (collectively, hosts $111_B$). The hosts $111_{B1}$-$111_{BN}$ include respective hypervisors $112_{B1}$-$112_{BN}$ (collectively, hypervisors $112_B$). The hosts $111_{B1}$-$111_{BN}$ also include respective pluralities of virtual machines $114_{B1}$-$114_{BN}$ (collectively, pluralities of virtual machines $114_B$). The second data center $110_B$ also includes a data center network device $115_B$ communicatively connected to each of the hosts 111. The hosts $111_A$ and $111_B$ may be referred to collectively as hosts 111. The hypervisors $112_A$ and $112_B$ may be referred to collectively as hypervisors 112.

The communication network 120 supports communications between the first data center $110_A$ and the second data center $110_B$ and between the security rules controller 140 and the data centers 110. The communication network 120 includes a plurality of network devices $122_1$-$122_M$ (collectively, network devices 122). The communication network 120 may include any type of communication network(s) suitable for supporting communications between data centers $110_A$ and $110_B$ and between the security rules controller 140 and the data centers 110. Similarly, the network devices 122 may include any type of communication network(s) suitable for supporting communications between data centers $110_A$ and $110_B$ and between the security rules controller 140 and the data centers 110 (e.g., routers, switches, or the like).

The security modules 130 are configured to receive, store, and apply security rules 152. The security modules 130 represent potential storage/application locations for security rules 152, at which security rules 152 may be stored and then applied. As noted above, the security modules 130 are distributed across various elements of cloud system 100. In data center $110_A$, the hypervisors $112_{A1}$-$112_{AN}$ include respective security modules $130_{A1}$-$130_{AN}$ and data center network device $115_A$ includes a security module $130_{BA}$ (collectively, security modules $130_A$). In data center $110_B$, the hypervisors $112_{B1}$-$112_{BN}$ include respective security modules $130_{B1}$-$130_{BN}$ and data center network device $115_B$ includes a security module $130_{SB}$ (collectively, security modules $130_B$). The network devices $122_1$-$122_M$ include respective security modules $130_{N1}$-$130_{NN}$ (collectively, security modules $130_N$). The security modules $130_A$, $130_B$, and $130_N$ are referred to collectively as security modules 130. The availability of security modules 130 at various locations of the cloud system 100 provides significant flexibility in enabling intelligent placement of security rules based on policies, conditions, or the like, as well as various combinations thereof.

The security modules 130 are configured to apply security rules 152 to communications traversing the elements on which the security modules 130 are disposed, respectively. For example, security modules $130_{A1}$-$130_{AN}$ of hosts $111_{A1}$-$111_{AN}$ may enforce security rules 152 on data sent to/received from the hosts $111_{A1}$-$111_{AN}$ (and virtual machines $114_{A1}$-$114_{AN}$ residing on $111_{A1}$-$111_{AN}$), respectively. Similarly, for example, security modules $130_{B1}$-$130_{BN}$ of hosts $111_{B1}$-$111_{BN}$ may enforce security rules 152 on data sent to/received from the hosts $111_{B1}$-$111_{BN}$ (and virtual machines $114_{B1}$-$114_{BN}$ residing on $111_{B1}$-$111_{BN}$), respectively. For example, security module $130_{SA}$ may enforce security rules 152 on data sent to/received from any of the hosts $111_A$ of data center $110_A$ (e.g., data exchanged between hosts $111_A$ within data center $110_A$, data exchanged between hosts $111_A$ of data center $110_A$ and any other device(s) located outside of data center $110_A$, or the like, as well as various combinations thereof). Similarly, for example, security module $130_{SB}$ may enforce security rules 152 on data sent to/received from any of the hosts $111_B$ of data center $110_B$ (e.g., data exchanged between hosts $111_B$ within data center $110_B$, data exchanged between hosts $111_B$ of data center $110_B$ and any other device(s) located outside of data center $110_B$, or the like, as well as various combinations thereof). For example, security modules $130_{N1}$-$130_{NM}$ of network devices $122_1$-$122_N$ may enforce security rules 152 on data (e.g., sent to/received from any of the hosts 111 of either of the data centers 110) that traverses the network device $122_1$-$122_N$, respectively.

The security modules 130 may include any suitable types of security elements configured to apply security rules 152 to communications between communication elements. For example, security modules 130 may include firewalls, Intrusion Detection Systems (IDSs), Intrusion Prevention Systems (IPSs), or any other type(s) of element(s) configured to maintain and execute security rules.

The security rules controller 140 is configured to control the security modules 130. The security rules controller 140 is configured to control distribution of the security rules 152 to the security modules 130, thereby enabling security rules controller 140 to control the manner in which the security rules 152 are applied within cloud system 100. The security rules controller 140 is communicatively connected to the communication network 120 and also to first data center $110_A$ and second data center $110_B$ for purposes of providing such functions.

The security rules controller 140 includes or otherwise has access to the security rules database 150 which, as described above, includes a plurality of security rules 152 and a plurality of security rule policies 154.

The security rules database 150 may include security rules 152 and security rule policies 154 for one or more customers.

The security rules 152 may include any types of security rules which may be applied by security elements (e.g., security modules 130) to communications between communication elements (e.g., VMs 114, hosts 111, network elements, or the like). For example, security rules 152 may include firewall rules, such as a rule for blocking traffic on a particular port (e.g., port 80, port 120, or the like), a rule for allowing traffic only from a particular port (e.g., port 10, port 50, or the like), a rule for rate-limiting traffic going out of a particular port (e.g., port 20, port 40, or the like), or the like, as well as various combinations thereof. For example, security rules 152 may include one or more intrusion detection rules (e.g., if traffic received via a connection matches a given pattern for which intrusion detection monitoring is being performed then flag the connection, or the like). For example, security rules 152 may include one or more intrusion prevention rules (e.g., if traffic received via a connection matches a given pattern for which intrusion prevention monitoring is being performed then drop the connection, or the like). The security rules 152 may include any other suitable types of rules adapted for use in securing communications between communication elements.

The security rules 152 may include any types of security rules which may be applied to communications between communication elements, which may include communications from any suitable number of source elements to any suitable number of destination elements. For example, a security rule 152 may be applied to communications between a source virtual machine and a destination virtual machine (e.g., within the same host 111, associated with different hosts 111 within the same data center 110, within different data centers 110, or the like). For example, a security rule 152 may be applied to communications between a virtual machine and a network device (e.g., a load-balancer or any other suitable network device). For example a security rule 152 may be applied to communications between multiple source communication elements and a single destination communication element. For example, a security rule 152 may be applied to communications between a single source communication element and multiple destination communication elements. It will be appreciated that other variations (e.g., in terms of the numbers and/or types of communication elements) are possible.

The security rules 152 may be organized in any suitable manner. The security rules 152 of security rules database 150 may be organized on a per-customer basis in order to enable distribution and application of the security rules 152 on a per-customer basis. The security rules 152 of security rules database 150 may be organized for groups of customers (e.g., where the security rules 152 and/or security policies 154 are shared among multiple customers). The security rules 152 of security rules database 150 may be organized in any other suitable manner.

The security rule policies 154 of security rules database 150 may include any policies which may be used to select locations for the security rules 152 for which the associated security rule policies 154 are defined. The security rule policies 154 may be defined based on considerations such as performance (e.g., level of security, latency, or the like), cost, or the like, as well as various combinations thereof. The security rule policies 154 may be defined based on more specific considerations such as the needs and/or desires of one or more customers (e.g., customer-specific policy parameters). It is noted that specific examples of security rule policies 154 are described in detail hereinbelow.

The security rule policies 154 may be organized in any suitable manner. The security rule policies 154 of security rules database 150 may be organized on a per-customer basis in order to enable application of security rule policies 154 on a per-customer basis (and also enabling each customer to define its own specific security rule policies 154 in place of or in addition to using more generic security rule policies 154 applicable to multiple customers). The security rule policies 154 of security rules database 150 may be organized for groups of customers (e.g., where the security rule policies 154 are shared among multiple customers). The security rule policies 154 of security rules database 150 may be organized in any other suitable manner.

The security rules 152 and security rule policies 154 may be associated with each other at any suitable granularity. In general, each security rule 152 has one or more security rule policies 154 associated therewith and each security rule policy 154 may be applied for one or more of the security rules 152. For example, a security rule 152 may have a single security rule policy 154 associated therewith (e.g., the same security rule policy 154 is always applied for the security rule 152) or may have multiple security rule policies 154 associated therewith (e.g., different ones of the associated security rule policies 154 may be applied for the security rule under different conditions). Similarly, for example, a security rule policy 154 associated with a security rule 152 may be dedicated for use with the security rule 152 or may be configured for use with multiple security rules 152 (e.g., different security rules 152 of the same customer, the same or similar security rules 152 across multiple customers, different security rules 152 of different customers, or the like, as well as various combinations thereof).

The security rules controller 140 is configured to select locations at which individual ones of the security rules 152 are to be applied, which may include any of the security modules 130 of cloud system 100. The security rules controller 140 is configured to select locations for security rules 152 under various conditions. The security rules controller 140 is configured to determine whether migration of a security rule 152 to the location selected for the security rule 152 is necessary. The security rules controller 140 is configured to control migration of individual ones of the security rules 152 to the selected locations at which the individual ones of the security rules 152 are to be applied, which may include migration of security rules 152 from security rules database 150 to security modules 130 and/or migration of security rules 152 between security modules 130. In this manner, security rules controller 140 is configured to provide a fluid security layer in which the security rules 152 may be migrated throughout the cloud system 100 as necessary and/or desired. These functions performed by the security rules controller 140 are described in additional detail below.

The security rules controller 140 is configured to select a location at which a security rule 152 is to be applied. In general, there may be various tradeoffs associated with selecting locations for the security rules 140. The security rules controller 140 may be configured to evaluate such tradeoffs in order to determine a location at which a security rule 152 is to be applied. The security rules controller 140 may evaluate such tradeoffs based on policies (e.g., security rule policies 154), security rule location selection information (e.g., statistics from one or more hypervisors 112, statistics from one or more data center network devices 115, statistics from one or more network devices 122, or the like), or the like, as well as various combinations thereof. In general, the evaluation of such tradeoffs may be better understood by considering an example. In this example, assume that a first virtual machine (e.g., one of the virtual machines $114_{A1}$ of host $111_{A1}$) is sending data to a second virtual machine (e.g., one of the virtual machines $114_{BN}$ of host $111_{BN}$), and a security rule 152 is defined for checking whether the data being sent by the first virtual machine is allowed to enter the second virtual machine. In this example, in order to check if the data being sent by virtual machine $111_{A1}$ is allowed to virtual machine $111_{BN}$, the security rule may be placed in hypervisor $112_{A1}$ of host $111_{A1}$, hypervisor $112_{BN}$ of host $111_{BN}$, or somewhere on the path in between (e.g., data center network device $115_A$, one of the network devices 122 on a path between virtual machine $111_{A1}$ and virtual machine $111_{BN}$, or data center network device $115_B$). As described previously, there are various pros and cons of each of these potential locations for the security rule 152, and the security rule controller 140 is configured to evaluate the various pros and cons in order to select a location for the security rule 152. For example, placing the security rule 152 relatively close to the data source (e.g., in the security module $130_{A1}$ of the hypervisor $112_{A1}$) is advantageous because it prevents excess traffic from entering the network (e.g., the data center network and/or communication network 120), but also leads to an increase in the number of copies of the security rule 152 that need to be distributed, stored, and applied as there can be a large number of data sources sending data to virtual machine $111_{BN}$ (and, thus, thereby increasing the CPU and memory costs associated with application of the security rule 152). By contrast, for example, placing the security rule 152 relatively close to the data destination (e.g., in the security module $130_{BN}$ of the hypervisor $112_{BN}$) is advantageous because it decreases the number of copies of the security rule 152 that need to be distributed, stored, and applied (and, thus, thereby decreases the CPU and memory costs associated with application of the security rule 152), but also leads to an increase in excess traffic in the network (e.g., the data center network and/or communication network 120) because all of the data will have to travel from the data source to a location close to the data destination (e.g., even when some such data may not even be allowed to enter virtual machine $114_{BN}$). Additionally, another option is to place the security rule 152 within the network where traffic from several sources/to several destinations aggregates (e.g., data center network device $115_A$, one of the network devices 122 on a path between virtual machine $111_{A1}$ and virtual machine $111_{BN}$, or data center network device $115_B$) as this provides a balance between the advantages and disadvantages of placing the security rule 152 near the source or destination; however, this involves additional computational overhead on security rules controller 140 as it requires security rules controller 140 to keep track of the topology of the virtual machines 114 and locations of the data sources and data destinations. As such, depending on various factors (e.g., policies, customer preferences, data center conditions, network conditions, or the like), security rules controller 140 must evaluate the potential locations for security rule 152 and select an appropriate location for security rule 152. The manner in which security rules controller 140 may select a location for a security rule 152 is described in additional detail below.

The security rules controller 140 is configured to select a location at which a security rule 152 is to be applied based on a security rule policy 154 associated with the security rule 152. The security rule policy 154 associated with the security rule 152 may specify the type of security rule location selection information considered by the security rules controller 140 in selecting a location for the security rule 152 and the manner in which the security rule location selection information is analyzed by the security rules controller 140 in selecting a location for the security rule 152. In other words, the security rule policy 154 for security rule 152 may be defined based on the relevant security rule location selection information associated with the security rule 152. The security rules controller 140 may be configured to initiate migration of a security rule 152 when a security rule policy 154 is satisfied or when a security rule policy 154 is violated (e.g., depending on the manner in which the security rule policy 154 is defined).

As noted above, the security rules controller 140 is configured to select a location at which a security rule 152 is to be applied based on a security rule policy 154 associated with the security rule 152. Examples of security rule policies 154 follow, although it will be appreciated that various other types of security rule policies 154 may be defined and utilized by the security rules controller 140 for controlling placement of security rules 152.

In one embodiment, a security rule policy 154 for a security rule 152 is configured to support or achieve an objective of reducing (and, in at least some cases, minimizing) latency introduced by the application of the security rule 152. In one such embodiment, this may be achieved by selecting, for the security rule 152, a location that is at or near a source of the communication for which the security rule 152 is to be applied or a location that is at or near a destination of the communication for which the security rule 152 is to be applied. In the case of communications within a single data center 110, for example, the security rule 152 may be placed at the security module 130 in the hypervisor 112 associated with the virtual machine 114 that is the source of the communication or may be placed at the security module 130 in the hypervisor 112 associated with the virtual machine 114 that is the destination of the communication (e.g., as opposed to being placed at the security module 130 that is associated with the data center network device 115 of that data center 110). In the case of communications between a source data center 110 and a destination data center 110, for example, the security rule 152 may be placed at the security module 130 in the hypervisor 112 associated with the virtual machine 114 that is the source of the communication or may be placed at the security module 130 in the hypervisor 112 associated with the virtual machine 114 that is the destination of the communication (e.g., as opposed to being placed at security modules of network devices which form the communication networks within the data centers 110 or being placed at security modules of network devices of communication network 120). If a virtual machine 114 for which the security rule 152 is placed moves from a current location to a new location, the security rules controller 140 may initiate migration of the security rule 152 to a location relatively close to the new location of the virtual machine 114 and, thus, still maintain a relatively low level of latency for communications by the virtual machine 114. It is noted that this type of customer preference would be quite difficult to achieve in data centers in which the location of the security is fixed.

In one embodiment, a security rule policy 154 for a security rule 152 is configured to support or achieve an objective of reducing (and, in at least some cases, minimizing) latency introduced by the application of the security rule 152 in the case in which the security rule is associated with a processing-intensive security mechanism (e.g., intrusion detection rules, intrusion prevention rules, and other relatively heavy weight systems and mechanisms that process data packets). In this case, if the security rule 152 is placed in a hypervisor 112 and is associated with a processing-intensive security mechanism that inspects packets of the communication, the overhead of checking the packets from the hypervisor 112 based on the security rule 152 is relatively high and can lead to increasing latency for the communication and, thus, for the system 100. In one embodiment, in response to detection that the security rule 152 is associated with a processing-intensive security mechanism that inspects packets of the communication, the security rules controller 140 may be configured to initiate spawning of a new virtual machine 114 (omitted for purposes of clarity) upstream of the sending virtual machine 114 and initiating migration of the security rule 152 to a security module 130 associated with the new virtual machine 114 (such that the heavy weight packet processing of the security rule 152 may be performed in conjunction with the new virtual machine 114 and, thus, the hypervisor 112 associated with the sending virtual machine 114 is no longer a bottleneck. In this manner, offloading of processing-intensive security rule 152 to dedicated virtual machines 114 enables latency to be kept relatively low.

In one embodiment, a security rule policy 154 for security rules 152 is configured to support or achieve an objective of reducing (and, in at least some cases, minimizing) overall cost of application of the security rules 152 by improving the overall efficiency of the datacenter(s) 110 for which the security rules 152 are applied. In one embodiment, the security rules controller 140 is configured to improve the overall efficiency of the datacenter(s) 110 for which the security rules 152 are applied by analyzing and balancing two types of resources: the cost of traffic sent on communication networks and the resources (e.g., CPU, memory, or the like) used in checking the security rules 152. In the case of security rules 152 associated with communication within a single data center 110, the cost of traffic sent on communication networks includes the cost of traffic sent on the data center network of the single data center 110. In the case of security rules 152 associated with communication of a single data center 110 that is both internal and external to the single data center 110, the cost of traffic sent on communication networks includes the cost of traffic sent on the data center network of the single data center 110 and the cost of traffic sent on the communication network supporting communications outside of the single data center 110 (e.g., on the portion(s) of communication network 120 used to support the traffic). In the case of security rules 152 associated with communications between multiple data centers 110, the cost of traffic sent on communication networks includes the cost of traffic sent on the data center networks of the respective data centers 110 and the cost of traffic sent on the communication network supporting communications outside of the single data center 110 (e.g., on the portion(s) of communication network 120 used to support the traffic). In one embodiment, by balancing the placement of the security rules 152 amongst the available security modules 130—which may include security modules 130 near the source(s) of communications, security modules 130 near the destination(s) of communications, and/or security modules 130 on network devices located intermediate to the source(s) and destination(s)—the overall cost of application of the security rules 152 may be reduced (and, in at least some cases, minimized). In one embodiment, this analysis of determining placement of security rules 152 to reduce overall cost of the security rules 152 may be performed using optimization techniques such as those which may be used to determine placement of virtual machines within data centers.

In one embodiment, a security rule policy 154 for security rules 152 is configured to support or achieve an objective of reducing (and, in at least some cases, minimizing) overall cost of application of the security rules 152 by improving the overall efficiency of the datacenter(s) 110 for which the security rules 152 are applied while also maintaining at least a threshold level of performance. In one embodiment, the security rules controller 140 is configured to achieve this objective by solving the problem as discussed in the immediately previous embodiment while also accounting for the additional constraint that the latency introduced by the security rules 152 is maintained below a defined maximum latency. It is noted that, although primarily described with respect to a specific type of performance measure (namely, latency), security rules controller 140 is configured to achieve this objective by solving the problem as discussed in the immediately previous embodiment while also accounting for other types of performance measures (e.g., one or more other types of performance measures in place of or in addition to the latency measure).

It is noted that, although primarily depicted and described herein more generally as being a security rule policy 154, in one embodiment the security rule policy 154 may be a customer policy defined by a customer and/or on behalf of a customer in order to achieve (or at least to attempt to achieve) a particular objective of the customer. It is noted that this may be true for any number of the security rule policies 154.

As noted above, the security rules controller 140 is configured to select a location at which a security rule 152 is to be applied based on security rule location selection information. Examples of security rule location selection information follow, although it will be appreciated that various other types of security rule location selection information may be obtained and utilized by the security rules controller 140 for controlling placement of security rules 152.

In one embodiment, the security rule location selection information may include one or more of data center status information, communication network status information (e.g., where the security rule 152 is intended to be applied for communications that traverse outside of the data center(s) 110 and, thus, that are supported by a communication network(s) that is located outside of the data center(s) 110), customer preference information, or the like, as well as various combinations thereof.

The data center status information for a data center 110 may include status information associated with hypervisors 112 of the data center 110 (e.g., load statistics), status information associated with network devices supporting communications within the data center 110 (e.g., network congestion information for the data center network), status information associated with hosts 111, status information associated with virtual machines 114 of hosts 111, or the like, as well as various combinations thereof. For the case of a security rule 152 that is associated with communications of a single data center 110 (e.g., intra data center communications between virtual machines 114 located within the data center 110, communications of the data center 110 that also are propagated outside of the data center 110 but are not associated with any other data centers 110, or the like), the data center status information may include status information associated with that single data center 110. For the case of a security rule 152 that is associated with communications between multiple data centers 110 (e.g., inter data center communications between virtual machines 114 that are located within different data centers 110), the data center status information may include status information associated with one or more of the associated data centers 110 (e.g., only the source data center 110 hosting the host 111 which is the source of communications for which the security rule 152 is to be applied, only the destination data center 110 hosting the host 111 which is the destination of communications for which the security rule 152 is to be applied, both the source and destination data centers 110, or the like).

The customer preference information may include any types of preferences which may be specified by a customer regarding application of security rules 152. The customer preference information may be specified for individual ones of the security rules 152, for sets of security rules 152, or the like, as well as various combinations thereof. The customer preference information may be specified or otherwise represented using one or more security rule policies 154 (e.g., where such security rule policies 154 may be specified for individual ones of the security rules 152, for sets of security rules 152, or the like, as well as various combinations thereof).

The security rules controller 140 may be configured to select the location for a security rule 152 at any suitable time (e.g., periodically, in response to an indication of a condition or event, or the like, as well as various combinations thereof). In one embodiment, upon detecting an indication that the security rules controller 140 is to select a location for a given security rule 152, the security rules controller 140 accesses the security rule policy or policies 154 associated with the security rule, accesses the relevant security rule location selection information, and selects a location for the security rule 152. In one embodiment, upon receiving security rule location selection information relevant to selection of a location for a given security rule 152, the security rules controller 140 processes the relevant security rule location selection information in accordance with the security rule policy 154 associated with the given security rule in order to select the location for the security rule 152. In such embodiments, it is noted that security rules controller 140 may perform such functions for multiple security rules 152 serially and/or contemporaneously (e.g., where there is an indication that location selection is to be performed for multiple security rules 152, where there is a determination that received security rule location selection information is relevant to multiple security rules 152, or the like, as well as various combinations thereof).

The security rules controller 140 is configured to determine whether migration of a security rule 152 to the location selected for the security rule 152 is necessary, at least because selection of the location for the security rule 152 may result in selection of the current location at which the security rule 152 is applied (i.e., in which case there is no need for the security rules controller 140 to migrate the security rule 152) or selection of a new location at which the security rule 152 is to be applied (i.e., in which case the security rules controller 140 initiates migration of the security rule 152 from the current location to the new location). Accordingly, security rules controller 140 may be configured to compare the selected location of the security rule 152 to the current location of the security rule 152 to determine whether or not it is necessary to initiate migration of the security rule 152 to the selected location of the security rule 152.

The security rules controller 140 is configured to control migration of security rules 152 to the locations selected by the security rules controller 140 for the security rules 152. The security rules controller 140 may control migration of a security rule 152 in any suitable manner. In the case of migration of a security rule 152 from security rules database 150 to a security module 130, the security rules controller 140 may retrieve the rule database 150 and propagate the security rule 152 to the security module 130. In the case of migration of a security rule 152 from a first security module 130 (current security module 130) to a second security module 130 (selected security module 13), the security rules controller 140 may retrieve either (1) send a message to the current security module 130 instructing the current security module 130 to send the security rule 152 to the selected security module 130) or (2) send a message to the current security module 130 instructing the current security module 130 to delete the security rule 152, retrieve the security rule 152 from the security rule database 150, and propagate the security rule 152 to the selected security module 130. In one embodiment, for at least some of the migrations of security rules 152 within cloud system 100, migration of the security rules 152 may be performed using one or more of ACL functions of routers, flow control functions of open-flow enabled switches, or the like, as well as various combinations thereof.

In this manner, security rules controller 140 enables distribution of the security rules 152 to the security modules 130 of cloud system 100 and migration of security rules 152 between security modules 130 of cloud system. The security rules controller 152 enables migration of security rules 152 between security modules 130 based on one or more of policies, data center dynamics, network dynamics, or the like, as well as various combinations thereof. The security modules 130 are configured to apply security rules 152 to communications traversing the elements on which the security modules 130 are disposed, respectively. The manner in which security rules 152 may be applied by the security modules 130 will be understood by one skilled in the art. In this manner, a fluid security layer is provisioned used within the cloud system 100 to improve the security of the cloud system 100.

It is noted that, although each data center 110 is depicted and described as having specific numbers and arrangements of hosts 111, hypervisors 112, data center network devices 115, and security modules 116, either or both of the data centers 110 may be implemented using any other suitable numbers and/or arrangements of hosts 111, hypervisors 112, data center network devices 115, and/or security modules 116. It is noted that, although each data center 110 is depicted and described as having only a single data center network device for networking within the respective data center 110, each data center 110 may use any suitable type of data center network including any suitable numbers and arrangements of network devices (e.g., top-of-rack switches, aggregators, routers, or the like, as well as various combinations thereof), i.e., data center network devices $115_A$ and $115_B$ of data centers $110_A$ and $110_B$ may be representative of data center communication networks which may support communications within the data centers $110_A$ and $110_B$ as well as to/from the data centers $110_A$ and $110_B$, respectively.

Figure 2:
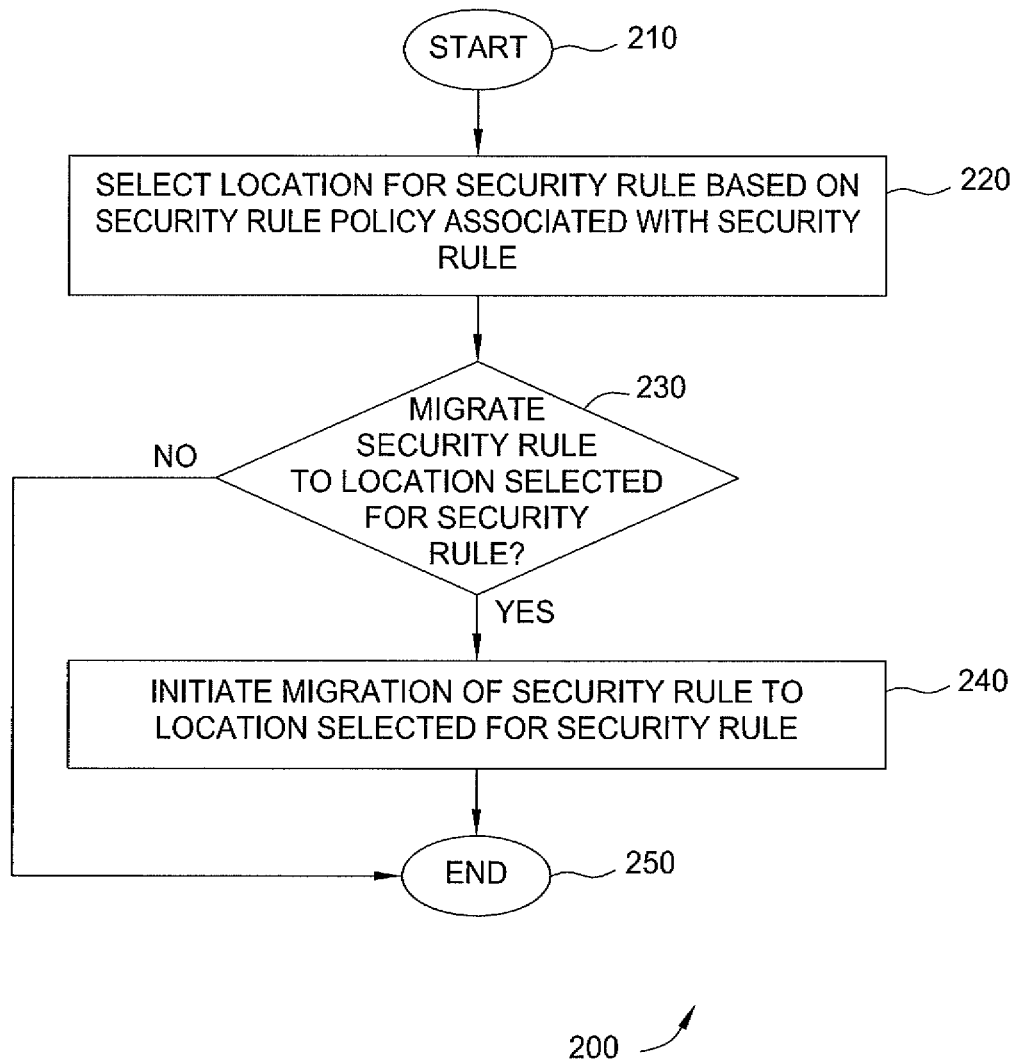
FIG. 2 depicts one embodiment of a method for selecting a location for a security rule based on a security rule policy.

FIG. 2 depicts one embodiment of a method for selecting a location for a security rule based on a security rule policy.

It is noted that method 200 of FIG. 2 may be invoked periodically, in response to detection of one or more conditions, in response to receiving information which may be evaluated for selecting a location for the security rule, or the like, as well as various combinations thereof.

It is noted that, although primarily depicted and described as being performed serially, the steps of method 200 may be performed contemporaneously and/or in a different order than presented in FIG. 2. The operation of method 200 may be better understood when considered in conjunction with FIG. 1.

At step 210, method 200 begins.

At step 220, a location is selected for a security rule based on a security rule policy associated with the security rule.

At step 230, a determination is made as to whether or not to migrate the security rule to the selected location. This may be a determination as to whether the selected location is the same as the current location at which the security rule is maintained. This may include a cost/benefit analysis to determine whether or not the benefit of migrating the security rule outweighs the cost of moving the security rule. If a determination is made not to migrate the security rule to the selected location (e.g., the selected location is the same as the current location at which the security rule is maintained), method 200 proceeds to step 250 where the method 200 ends. If a determination is made to migrate the security rule to the selected location, method 200 proceeds to step 240.

At step 240, migration of the security rule to the selected location is initiated. From step 240, method 200 proceeds to step 250.

At step 250, method 200 ends.

Figure 3:
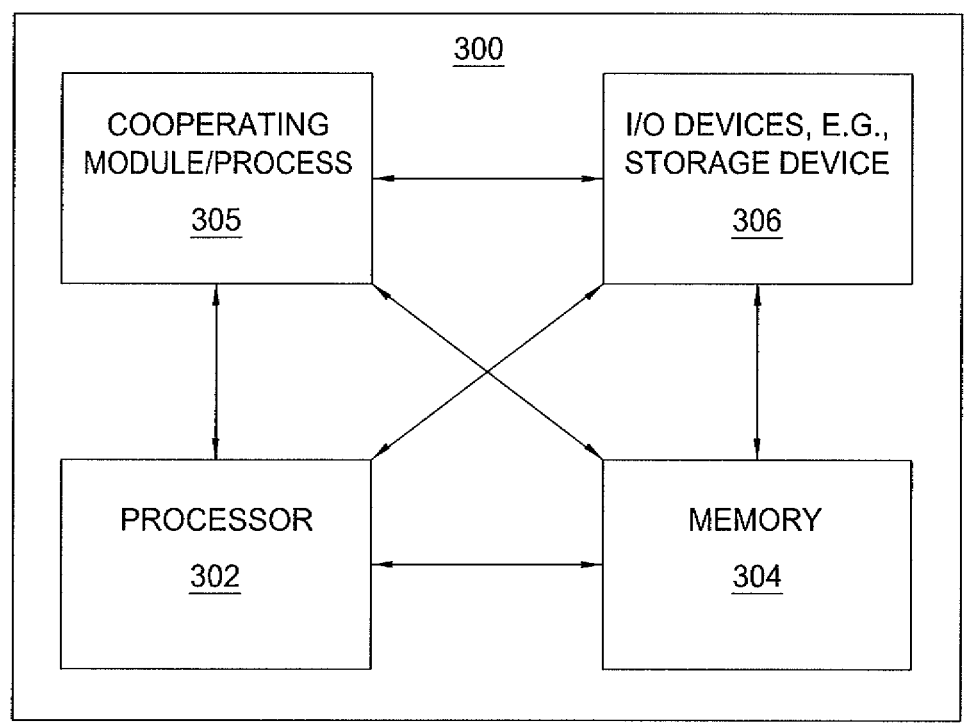
FIG. 3 depicts a high-level block diagram of a computer suitable for use in performing functions described herein.

FIG. 3 depicts a high-level block diagram of a computer suitable for use in performing functions described herein.

The computer 300 includes a processor element 302 (e.g., a central processing unit (CPU) and/or other suitable processor(s)) and a memory 304 (e.g., random access memory (RAM), read only memory (ROM), or the like). The computer 300 also may include a cooperating module/process 305 and/or various input/output devices 306 (e.g., a user input device (such as a keyboard, a keypad, a mouse, or the like), a user output device (such as a display, a speaker, or the like), an input port, an output port, a receiver, a transmitter, and storage devices (e.g., a tape drive, a floppy drive, a hard disk drive, a compact disk drive, or the like)). The cooperating process 305 can be loaded into memory 304 and executed by the processor 302 to implement functions as discussed herein and, thus, cooperating process 305 (including associated data structures) can be stored on a computer readable storage medium, e.g., RAM memory, magnetic or optical drive or diskette, or the like.

It will be appreciated that computer 300 depicted in FIG. 3 provides a general architecture and functionality suitable for implementing functional elements described herein and/or portions of functional elements described herein. For example, the computer 300 provides a general architecture and functionality suitable for implementing one or more of one or more hosts 111, a hypervisor 112, a switch 115, a network device 122, a security module 130, security rules controller 140, security rules database 150, and so forth.

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), and/or any other hardware equivalents).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
   a processor and a memory communicatively connected to the processor, the processor configured to:
   receive a security policy associated with a security rule, wherein the security policy associated with the security rule is based on at least one of a latency associated with application of the security rule or a cost associated with application of the security rule;
   receive security rule location selection information associated with the security rule, wherein the security rule location selection information comprises at least one of hypervisor status information associated with one or more hypervisors, network congestion information, or user preference information;
   select a location for a security rule based on the security policy associated with the security rule and the security rule location selection information associated with the security rule;
   determine whether to migrate the security rule to the location selected for the security rule; and
   initiate migration of the security rule to the location selected for the security rule based on a determination to migrate the security rule to the location selected for the security rule.

2. The apparatus of claim 1, wherein the policy associated with the security rule is configured to reduce or minimize the latency associated with application of the security rule.

3. The apparatus of claim 1, wherein the security rule is associated with a virtual machine (VM) that was previously associated with a hypervisor and that has been migrated to a new device, wherein the location selected for the security rule is located on the new device.

4. The apparatus of claim 1, wherein the security rule is associated with a packet processing function migrated from a hypervisor of a host to a virtual machine (VM) on the host, wherein the location selected for the security rule is the VM.

5. The apparatus of claim 1, wherein the policy associated with the security rule is configured to reduce or minimize the cost associated with application of the security rule.

6. The apparatus of claim 5, wherein the policy associated with the security rule is configured to balance a cost associated with transporting data for which the security rule is to be applied and a cost associated with processing resources used for application of the security rule.

7. The apparatus of claim 1, wherein the policy associated with the security rule is configured to reduce or minimize the cost associated with application of the security rule while maintaining the latency associated with application of the security rule at or below a threshold.

8. The apparatus of claim 1, wherein the policy associated with the security rule is associated with at least one other security rule.

9. The apparatus of claim 1, wherein the security rule is stored at a current location, wherein to initiate migration of the security rule to the selected location the processor is configured to:
   initiate migration of the security rule from the current location to the selected location.

10. The apparatus of claim 9, wherein the current location comprises one of a hypervisor, a network device, or a controller.

11. The apparatus of claim 9, wherein the selected location comprises one of a hypervisor or a network device.

12. The apparatus of claim 1, wherein the security rule is configured to provide security for communication between a first communication element and a second communication element.

13. The apparatus of claim 12, wherein the first communication element is a virtual machine, wherein the second communication element is a virtual machine or a network device.

14. The apparatus of claim 1, wherein the security rule is configured to provide security for communication between a first virtual machine and a second virtual machine.

15. The apparatus of claim 14, wherein the first and second virtual machines are located in a single datacenter.

16. The apparatus of claim 15, wherein the selected location comprises a hypervisor of a host hosting the first virtual machine, a network device of a data center network of the data center, or a hypervisor of a host hosting the second virtual machine.

17. The apparatus of claim 14, wherein the first virtual machine is located within a first data center and the second virtual machine is located within a second data center.

18. The apparatus of claim 17, wherein the selected location comprises a hypervisor of a host hosting the first virtual machine, a network device of a data center network of the first data center, a network device of a communication network supporting communications between the first data center and the second data center, a network device of a data center network of the second data center, or a hypervisor of a host hosting the second virtual machine.

19. A method, comprising:
    receiving, by a processor, a security policy associated with a security rule, wherein the security policy associated with the security rule is based on at least one of a latency associated with application of the security rule or a cost associated with application of the security rule;
    receiving, by the processor, security rule location selection information associated with the security rule, wherein the security rule location selection information comprises at least one of hypervisor status information associated with one or more hypervisors, network congestion information, or user preference information;
    selecting, by the processor, a location for a security rule based on the security policy associated with the security rule and the security rule location selection information associated with the security rule;
    determining, by the processor, whether to migrate the security rule to the location selected for the security rule; and
    initiating, by the processor, migration of the security rule to the location selected for the security rule based on a determination to migrate the security rule to the location selected for the security rule.

20. A non-transitory computer-readable storage medium storing instructions which, when executed by a computer, cause the computer to perform a method, the method comprising:
    receiving a security policy associated with a security rule, wherein the security policy associated with the security rule is based on at least one of a latency associated with application of the security rule or a cost associated with application of the security rule;
    receiving security rule location selection information associated with the security rule, wherein the security rule location selection information comprises at least one of hypervisor status information associated with one or more hypervisors, network congestion information, or user preference information;
    selecting a location for a security rule based on the security policy associated with the security rule and the security rule location selection information associated with the security rule;
    determining whether to migrate the security rule to the location selected for the security rule; and
    initiating migration of the security rule to the location selected for the security rule based on a determination to migrate the security rule to the location selected for the security rule.

* * * * *